United States Patent
Hunt et al.

(10) Patent No.: US 9,609,005 B2
(45) Date of Patent: Mar. 28, 2017

(54) CROSS-VIEW MALWARE DETECTION

(71) Applicant: McAfee, Inc., Santa Clara, CA (US)

(72) Inventors: Simon Hunt, Santa Clara, CA (US);
Jennifer Mankin, San Jose, CA (US);
Jeffrey Zimmerman, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/496,860

(22) Filed: Sep. 25, 2014

(65) Prior Publication Data

US 2016/0094570 A1    Mar. 31, 2016

(51) Int. Cl.
    *H04L 29/06*     (2006.01)
    *G06F 21/56*     (2013.01)

(52) U.S. Cl.
    CPC ........ *H04L 63/1416* (2013.01); *G06F 21/566* (2013.01); *H04L 63/145* (2013.01); *H04L 63/1491* (2013.01)

(58) Field of Classification Search
    CPC .............. H04L 63/1416; H04L 63/145; H04L 63/1491; G06F 21/566; G06F 2221/2105
    See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 7,665,123 B1* | 2/2010 | Szor ...................... | G06F 21/554 713/188 |
| 9,087,199 B2* | 7/2015 | Sallam .................. | G06F 21/575 |
| 2007/0107058 A1 | 5/2007 | Schuba et al. | |
| 2008/0320594 A1* | 12/2008 | Jiang ..................... | G06F 21/566 726/24 |
| 2013/0117766 A1* | 5/2013 | Bax ......................... | G06F 13/14 719/323 |
| 2014/0222641 A1* | 8/2014 | Kober .................... | G06Q 40/04 705/37 |

(Continued)

FOREIGN PATENT DOCUMENTS

| KR | 10-2012-0087508 A | 8/2012 |
|---|---|---|
| WO | 2016048541 A1 | 3/2016 |

OTHER PUBLICATIONS

Shields, Tyler. "Survey of Rootkit Technologies and Their Impact on Digital Forensics." Personal Communication (2008), pp. 1-11.*

(Continued)

*Primary Examiner* — Mohammad A Siddiqi
(74) *Attorney, Agent, or Firm* — Patent Capital Group

(57) ABSTRACT

In an example, a cross-view detection engine is disclosed for detecting malware behavior. Malware may attempt to avoid detection by remaining in volatile memory for as long as possible, and writing to disk only when necessary. To avoid detection, the malware may also provide a pseudo-driver at a file system level that performs legitimate-looking dummy operations. A firmware-level driver may simultaneously perform malicious operations. The cross-view detection engine detects this behavior by deconstructing call traces from the file system-level operations, and reconstructing call traces from firmware-level operations. If the traces do not match, the object may be flagged as suspicious.

25 Claims, 4 Drawing Sheets

(56) References Cited

U.S. PATENT DOCUMENTS

2015/0234718 A1* 8/2015 Dang .................. G06F 11/1484
  711/133
2015/0242626 A1* 8/2015 Wang ..................... G06F 21/56
  726/23

OTHER PUBLICATIONS

Heasman, John; "Implementing and detecting a PCI rootkit."; Feb. 20, 2007 (2006): pp. 1-15.*
International Search Report and Written Opinion in International Application No. PCT/US2015/046822, mailed on Dec. 4, 2015, 10 pages.
Flatley, Bridget N., "Rootkit Detection Using a Cross-View Clean Boot Method," No. AFIT-ENG-13-M-18, Department of the Air Force Air University, Dec. 31, 2013, 83 pages.
Rutkowska, Joanna, "Thoughts About Cross-View Based Rootkit Detection," http://invisiblethings.org, Jun. 30, 2005, 3 pages.

* cited by examiner

CROSS-VIEW MALWARE DETECTION

FIELD OF THE DISCLOSURE

This application relates to the field of computer security, and more particularly to a cross-view malware detection engine.

BACKGROUND

Security research has evolved into a perpetual arms race between security researchers on the one hand and malware authors on the other hand. Security researchers, for their part, are primarily concerned with detecting and remediating malware to protect end users and enterprises from malice and harm. In contrast, malware authors are concerned with avoiding detection so that their malware objects can continue to propagate across enterprises and networks.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
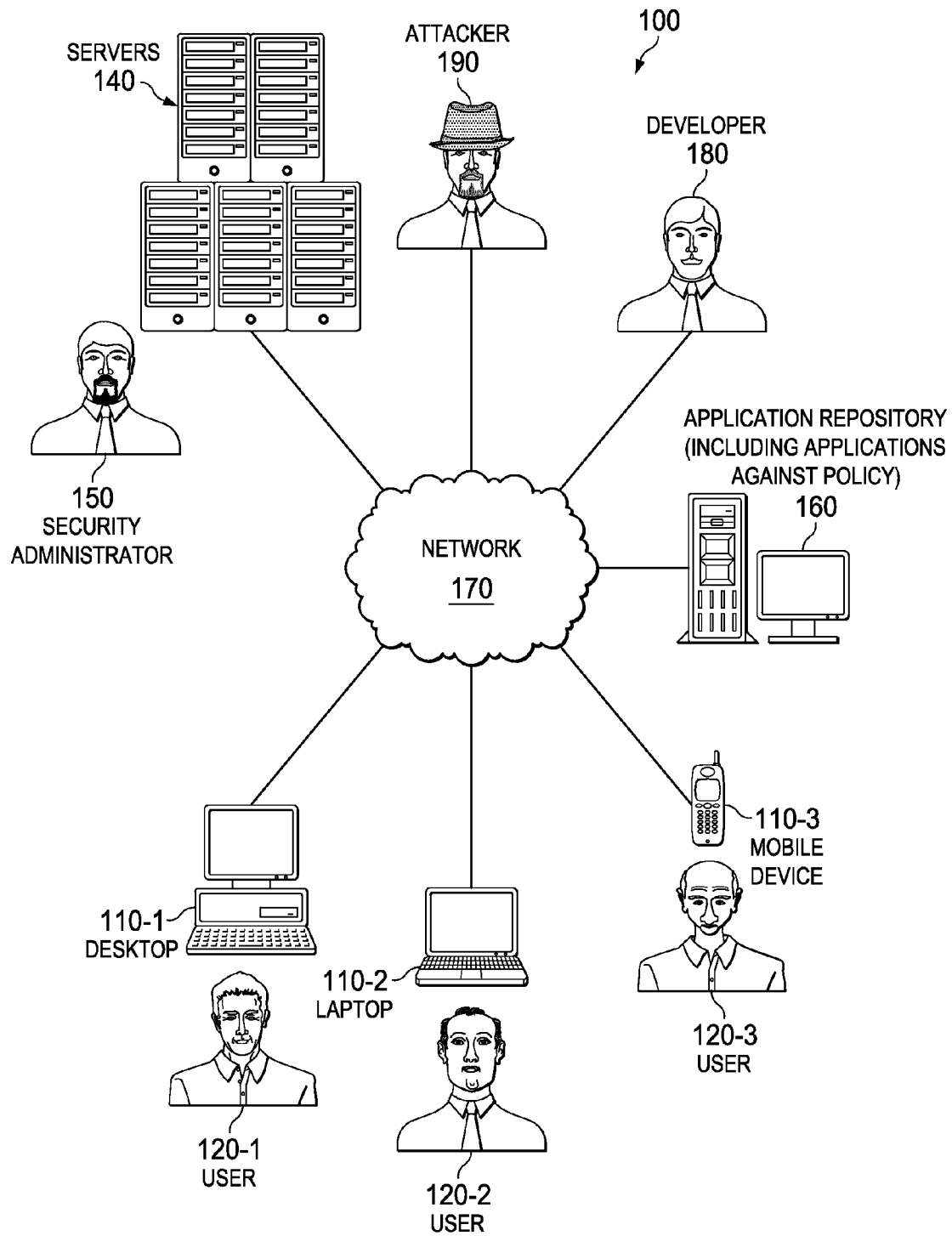
FIG. 1 is a block diagram of a security-enabled network according to one or more examples of the present Specification.

In an example, a cross-view detection engine is disclosed for detecting malware behavior. Malware may attempt to avoid detection by remaining in volatile memory for as long as possible, and writing to disk only when necessary. To avoid detection, the malware may also provide a pseudo-driver at a file system level that performs legitimate-looking dummy operations. A firmware-level driver may simultaneously perform malicious operations. The cross-view detection engine detects this behavior by deconstructing call traces from the file system-level operations, and reconstructing call traces from firmware-level operations. If the traces do not match, the object may be flagged as suspicious

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

One manifestation of the security arms race may be seen in disk operations performed by certain classes of malware objects. In one example, an antivirus agent is installed on a user machine to detect certain classes of write operations by executable objects. Experiential data indicate that these types of write operations are generally performed only by malware.

In particular, a goal of certain malware objects is to remain persistent on the end-user's machine, such as across reboots and computer crashes. Thus, it is not sufficient for the malware object to simply remain in nonvolatile memory. However, remaining in nonvolatile memory is the executable object's best option for evading detection in certain embodiments. Thus, in one embodiment, a "root kit" may try to avoid dynamic analysis. For example, the ZeroAccess rootkit uses two techniques to modify and store persistent data on disk without being detected by dynamic analysis. In the first, it uses a low-level API to create a new disk volume on which it can store malicious executables. This volume is invisible to the user and to certain security agents running on the system.

In the second technique, it creates a kernel-mode driver. This driver calls file system APIs directly, bypassing interfaces that may be monitored by antimalware agents. This driver secretly creates a configuration file in the file system and returns fake data whenever security software requests a read to infected files. Since the malicious executable resides in kernel space, it need not use interfaces monitored by system call-based dynamic analyzers.

In another example, the "TDSS" rootkit also bypasses file system analysis by storing its malicious driver in raw disk sectors, and overwriting the Master Boot Record (MBR). The MBR loads the malicious code from the raw disk sectors during boot. This read may not be detected in dynamic analysis.

Thus, a traditional anti-malware engine may have difficulty detecting the malware object. However, the malware object must ultimately write to disk to remain persistent. Thus, certain embodiments of anti-malware engines detect and flag suspicious write operations. This may subject the executable object to additional scrutiny, and may ultimately result in the malware object being correctly identified as malware.

Continuing the arms race, certain malware objects spoof legitimate-looking disk operations at a "higher" (more abstract) level of operation, while simultaneously performing low-level (less abstract) disk operations, such as raw writes to the desk without going through the file system driver. An anti-malware agent operating on the computer may see only the legitimate looking disk operations to maintain a persistent copy of the malware on machine. Thus, the anti-malware agent may continue to believe that the disk is malware free, while in fact the malware object has successfully avoided detection.

It is therefore beneficial to provide a system and method of cross-view malware detection, wherein a cross-view detection engine is provided to monitor both high level disk operations and low-level disk operations. In this context, a "high level" disk operation is a disk operation performed, such as through an application programming interface (API), it's file system driver, or other legitimate avenue providing abstraction of file system operations. A "low level" disk operation is an operation that occurs below the level of a file system driver, or other legitimate abstraction mechanism. It should be noted that these examples of high-level and low-level operations are provided by example only, and are not intended to be limiting. In certain embodiments of the present Specification, there may be some overlap between operations considered low-level operations and high-level operations. Thus, in one embodiment, a low-level operation is any operation that is performed at a lower level of abstraction then a high-level operation. Thus, one example distinguishing feature between a high-level operation and a low-level operation is that they do not operate on identical levels of abstraction.

In one example, a cross-view detection engine monitors both high-level disk operations and low-level disk operations in the background. This may be accomplished, for example, by operating the cross-view detection engine as a background process operating with elevated system privileges. These elevated system privileges may be, in one example, only slightly less privileged than the operating system itself. In another example, a cross-view detection engine is provided in firmware or in extremely low-level software, such that it actually operates at a privilege level higher than the operating system. Practitioners in the art may recognize that selection and design of a particular cross-view detection engine, and the level of privilege that it operates at, are design decisions that may be dictated by design constraints. It is therefore intended that any such variations on a cross-view detection engine be included with in this Specification.

In another example, a cross-view detection engine includes two or more components. One component is a firmware level driver operating with essentially unrestricted privileges, while a second component is a file system level driver, which may interact with the operating system and file system via operating system hooks, and which may have application-level privileges or elevated system privileges on the operating system. These two components may cooperate to detect malware disk operations.

In one embodiment, it may be presumed that if an executable object simultaneously performs a "dummy" high-level disk operation, while also performing a low-level disk operation that does not match the high-level disk operation, the executable object can safely be deemed malware.

By their nature, low-level disk operations will not be inherently or naturally comparable to high-level commands. By design, high-level operations are intended to be more abstract than low-level operations. In one example, a simple write to disk may be performed at a higher level of abstraction by calling a standard library function such as fprintf( ). The standard library function thereafter provides the necessary low-level operations to complete the disk write operation. Thus, one or the other or both of high-level disk operations and low-level disk operations will need to be translated into a new form so that they can be usefully compared.

In one example, high-level disk operations are reduced to a series of call traces. Call traces and call graph clustering are described in the paper "Malware Classification based on Call Graph Clustering" by Joris Kinable and Orestis Kostakis, published Aug. 27, 2010. This paper is available, as of the date of this application, at http://arxiv.org/abs/1008.4365.

Simultaneously, low-level disk operations are reconstructed into equivalent call traces. Thus, the deconstructed call traces of the high-level operation may be compared to the reconstructed call traces of the low-level operation to determine whether the call traces match.

If the call traces do not match, then it may be inferred that the low-level disk operation is not doing what the high-level operation appears to be doing. This behavior is highly characteristic of malware, and an object behaving in this way may be flagged.

It is recognized herein that there is not necessarily a simple one-to-one correlation between disk events and a file system operation, or stated differently, there is no clear sequence of events that always corresponds to an example operation such as "write to file." When raw bytes are intercepted on their way to the disk, the result is in fact a slice of what appears or will appear on the disk itself. To determine what operation happened, a cross-view detection engine may use the following information:

The previous state of the disk (e.g., which disk sectors contained which files and which metadata).

The intercepted data (e.g., what data or metadata are being written to disk in that single transaction).

By way of example, in the Windows new technology file system (NTFS), the main data structure is the Master File Table (MFT). There is one entry in the MFT for every file on the disk, and the MFT entry contains metadata describing that file (for example, its name and a list of all the sectors on the disk in which its contents are found).

When performing low-level disk analysis, the cross-view detection engine does not intercept, for example, a specific event that correlates cleanly to "create a file called newfile.txt," or "delete a file called newfile.txt." Rather, the cross-view detection engine may simply intercept a data block that has the format of an MFT entry (or that resides on a sector known to contain MFT entries). The cross-view detection engine may then parse the metadata to determine if there have been any changes since the metadata was last encountered.

Similarly, to intercept a file write operation, the cross-view detection engine cannot simply identify an event that corresponds to "Write 'abc' to file newfile.txt." Rather, the bus will simply send the raw bytes 'abc' to a disk sector known to belong to the file "newfile.txt"

In that context, some non-limiting examples of correlations between call traces and low-level operations are provided below.

Example 1 Trace

CREATE file "newfile.txt"
WRITE to file "newfile.txt"
A corresponding set of low-level disk events and conditions may include:
Write to disk block 8000
Disk block 8000 is known to belong to the MFT, and thus stores an MFT entry (metadata about a file)
The MFT entry is marked as "in-use" (valid)
Previously, there was no "in-use" (valid) metadata at that location. Therefore, this is a new file.
The intercepted MFT indicates that the file is called "newfile.txt" and has its contents stored on disk blocks 123000 to 123400
Disk write to block 123000
Disk block 123000 is known to belong to file newfile.txt Example 2 Trace DELETE file "newfile.txt"
A corresponding set of low-level disk events and conditions may include:
Write to disk block 8000
Disk block 8000 is known to be the MFT entry for file "newfile.txt"
The intercepted MFT entry is marked as "not in use" (not valid)
The data record was previously marked as "in-use" (valid)

Example 3 Trace

DELETE file "newfile.txt"
CREATE file "newerfile.txt"
A corresponding set of low-level disk events and conditions may include:
Write to disk block 8000
Disk block 8000 was known to be the MFT entry for file "newfile.txt"
The MFT entry is marked as "in-use" (valid)
The data record was previously marked as "in-use" (valid)
The MFT entry previously was listed as having a sequence number of 12
The intercepted MFT entry shows a sequence number of 13
In other words, a file was deleted and another created very quickly, and the newer file took the just-vacated MFT entry slot.

The semantic reconstruction of operations from raw data is file system-specific; that is, these heuristics only apply to the Windows NTFS file system, but may not necessarily apply to other file systems.

A cross-view detection engine will now be described with more particular reference to the attached FIGURES.

FIG. 1 is a network-level diagram of a distributed security network 100 according to one or more examples of the present Specification. In the example of FIG. 1, a plurality of users 120 operates a plurality of computing devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in some cases may also be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Computing devices 110 may be communicatively coupled to one another and to other network resources via network 170. Network 170 may be any suitable network or combination of networks, including for example, a local area network, a wide area network, a wireless network, a cellular network, or the Internet by way of nonlimiting example. In this illustration, network 170 is shown as a single network for simplicity, but in some embodiments, network 170 may include a large number of networks, such as one or more enterprise intranets connected to the Internet.

Also connected to network 170 are one or more servers 140, an application repository 160, and human actors connecting through various devices, including for example an attacker 190 and a developer 180. Servers 140 may be configured to provide suitable network services including certain services disclosed in one or more examples of the present Specification. In one embodiment, one or more security administrators 150 administer servers 140 and at least a part of network 170.

It may be a goal of users 120 to successfully operate their respective computing devices 110 without interference from attacker 190 and developer 180. In one example, attacker 190 is a malware author whose goal or purpose is to cause malicious harm or mischief. The malicious harm or mischief may take the form of installing root kits or other malware on computing devices 110 to tamper with the system, installing spyware or adware to collect personal and commercial data, defacing websites, operating a botnet such as a spam server, or simply to annoy and harass users 120. Thus, one aim of attacker 190 may be to install his malware on one or more computing devices 110. As used throughout this Specification, malicious software ("malware") includes any virus, trojan, zombie, rootkit, backdoor, worm, spyware, adware, ransomware, dialer, payload, malicious browser helper object, cookie, logger, or similar designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Servers 140 may be operated by a suitable enterprise to provide security updates and services, including anti-malware services. Servers 140 may also provide substantive services such as routing, networking, enterprise data services, and enterprise applications. In one example, servers 140 are configured to distribute and enforce enterprise computing and security policies. These policies may be administered by security administrator 150 according to written enterprise policies. Security administrator 150 may also be responsible for administering and configuring servers 140, and all or a portion of network 170.

Developer 180 may also operate on network 170. Developer 180 may not have malicious intent, but may develop software that poses a security risk. For example, a well-known and often-exploited security flaw is the so-called buffer overrun, in which a malicious user such as attacker 190 is able to enter an overlong string into an input form and thus gain the ability to execute arbitrary instructions or operate with elevated privileges on a computing device 110. Buffer overruns may be the result, for example, of poor input validation or incomplete garbage collection, and in many cases arise in nonobvious contexts. Thus, although not malicious himself, developer 180 may provide an attack vector for attacker 190. Applications developed by developer 180 may also cause inherent problems, such as crashes, data loss, or other undesirable behavior. Developer 180 may host software himself, or may upload his software to an application repository 160. Because software from developer 180 may be desirable itself, it may be beneficial for developer 180 to occasionally provide updates or patches that repair vulnerabilities as they become known.

Application repository 160 may represent a Windows or Apple "app store," a Unix-like repository or ports collection, or other network service providing users 120 the ability to interactively or automatically download and install applications on computing devices 110. Developer 180 and attacker 190 may both provide software via application repository 160. If application repository 160 has security measures in place that make it difficult for attacker 190 to distribute overtly malicious software, attacker 190 may instead stealthily insert vulnerabilities into apparently beneficial applications.

In some cases, one or more users 120 may belong to an enterprise. The enterprise may provide policy directives that restrict the types of applications that can be installed, for example from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions.

In another example, user 120 may be a parent of young children, and wish to protect the children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Collectively, any object that is a candidate for being one of the foregoing types of content may be referred to as "potentially unwanted content" (PUC). The "potentially" aspect of PUC means that when the object is marked as PUC, it is not necessarily blacklisted. Rather, it is a candidate for being an object that should not be allowed to reside or work on a computing device 110. Thus, it is a goal of users 120 and security administrator 150 to configure and operate computing devices 110 so as to usefully analyze PUC and make intelligent decisions about how to respond to a PUC object. This may include an agent on computing device 110, such as cross-view detection engine 224 of FIG. 2, which may communicate with servers 140 for additional intelligence. Servers 140 may provide network-based services, including server engine 324 of FIG. 3, that are configured to enforce policies, and otherwise assist computing devices 110 in properly classifying and acting on PUC.

Figure 2:
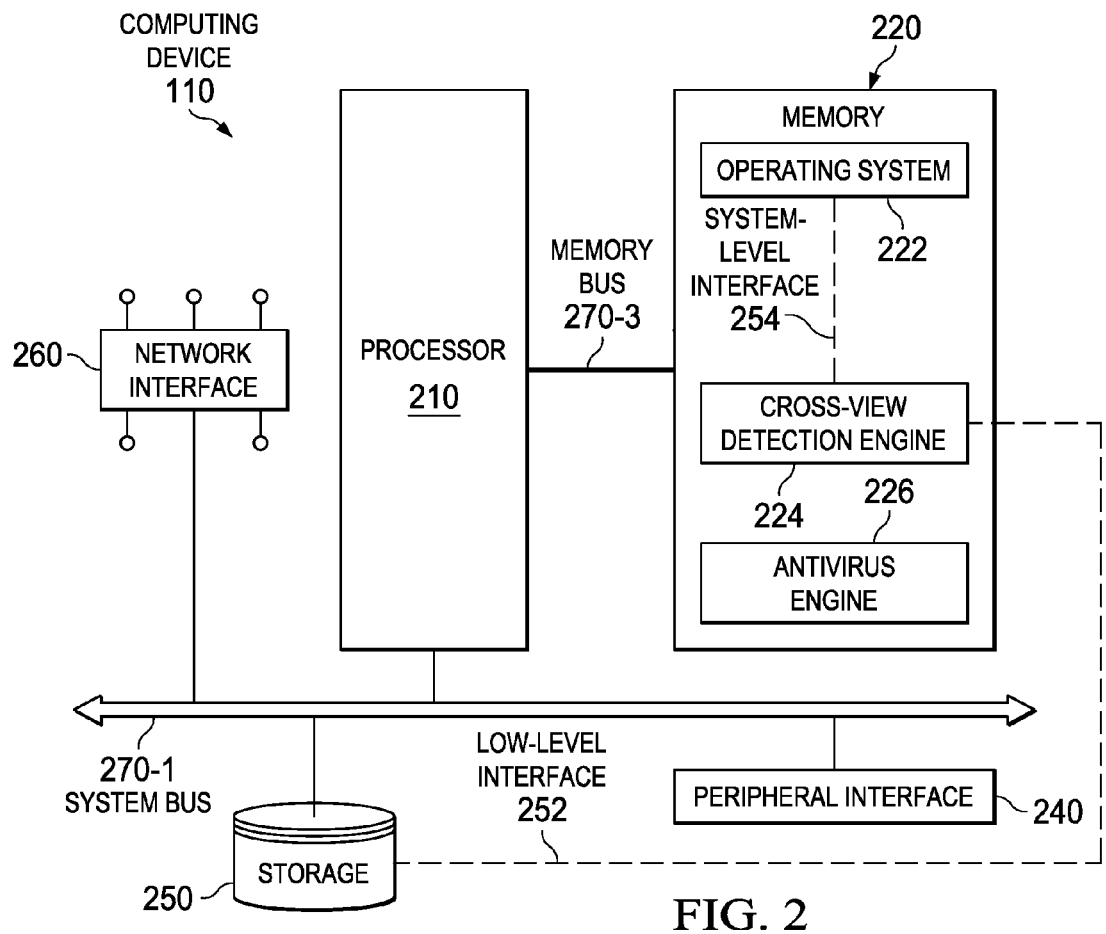
FIG. 2 is a block diagram of a computing device according to one or more examples of the present Specification.

FIG. 2 is a block diagram of client device 110 according to one or more examples of the present Specification. Client device 110 may be any suitable computing device. In various embodiments, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data Client device 110 includes a processor 210 connected to a memory 220, having stored therein executable instructions for providing an operating system 222 and cross-view detection engine 224. Other components of client device 110 include a storage 250, network interface 260, and peripheral interface 240.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device, such as a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of cross-view detection engine 224. Many other configurations are also possible, and are intended to be encompassed within the broad scope of this Specification.

Network interface 260 may be provided to communicatively couple client device 110 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Figure 5:
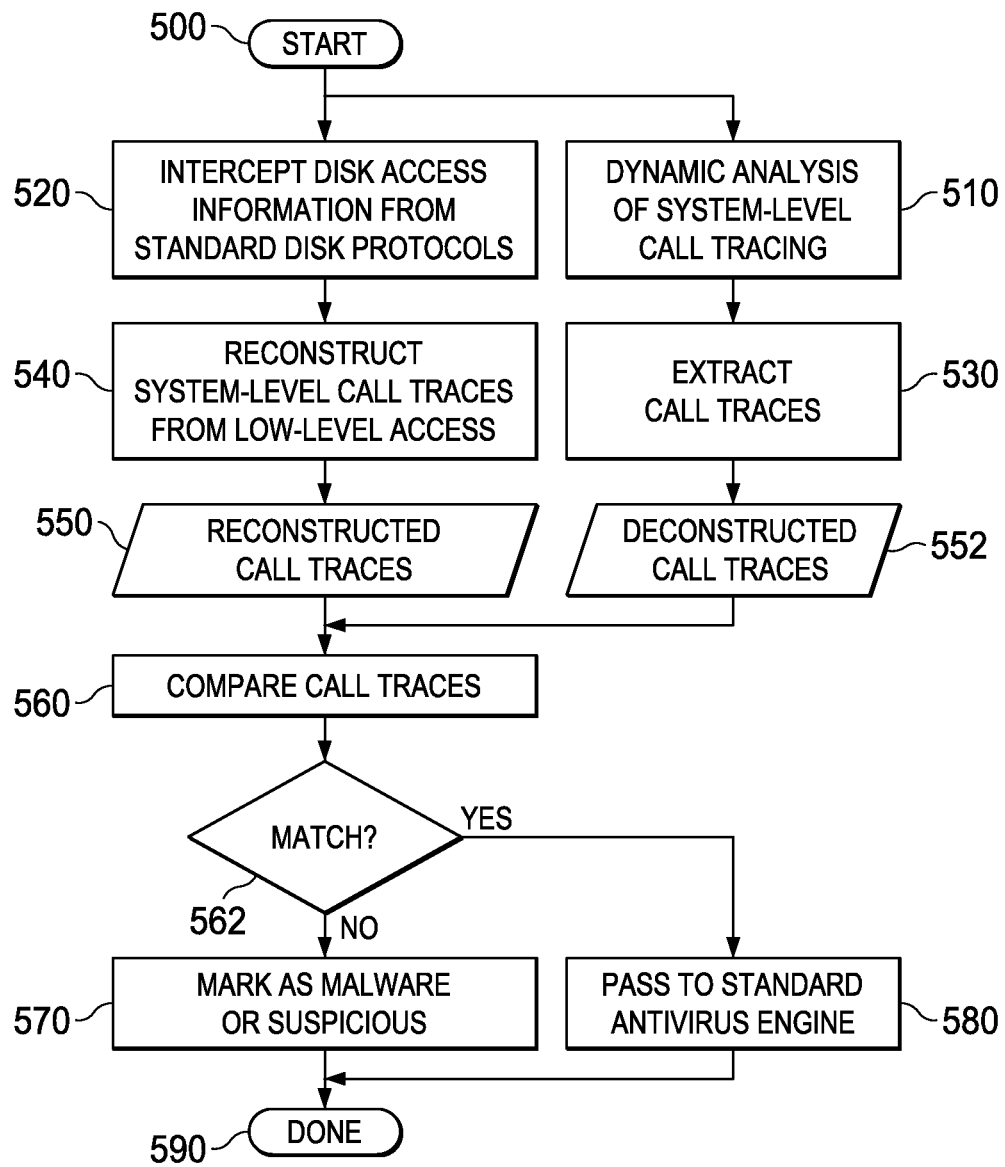
FIG. 5 is a flow chart of a method performed by a cross-view detection engine according to one or more examples of the present Specification.

Cross-view detection engine 224, in one example, is a utility or program that carries out a method, such as method 500 of FIG. 5, or other methods according to this Specification. Cross-view detection engine 224 may be, in various embodiments, embodied in hardware, software, firmware, or some combination thereof. For example, in some cases, cross-view detection engine 224 may include a special integrated circuit designed to carry out a method or a part thereof, and may also include software instructions operable to instruct a processor to perform the method. In some cases, cross-view detection engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. It should also be noted that cross-view detection engine 224 is provided by way of non-limiting example only, and that other hardware and software, including interactive or user-mode software, may also be provided in conjunction with, in addition to, or instead of cross-view detection engine 224 to perform methods according to this Specification.

In one example, cross-view detection engine 224 includes executable instructions stored on a non-transitory medium operable to perform antimalware operations. At an appropriate time, such as upon booting client device 110 or upon a command from operating system 222 or a user 120, processor 210 may retrieve a copy of cross-view detection engine 224 (or software portions thereof) from storage 250 and load it into memory 220. Processor 210 may then iteratively execute the instructions of cross-view detection engine 224.

Cross-view detection engine 224 and antivirus engine 226 may combine to provide standard antivirus services. Cross-view detection engine 224 includes a system-level interface 254 and a low-level interface 252.

Low-level interface 252 may be provided, for example, in firmware or in extremely low-level software, so that it may in some cases operate below the abstraction level of operating system 222. System-level interface 254 may operate above the abstraction level of operating system 222, and may have elevated system privileges. This means that although system-level interface 254 does not have the unfettered access of low-level interface 252, it may have higher system privileges than user space application programs. This enables system-level interface 254 to insert hooks into operating system 222 so as to intercept disk operations for purposes of comparison. In certain embodiments, system-level interface 254 may be provided at a virtualization level or at a hypervisor level.

Peripheral interface 240 may be configured to interface with any auxiliary device that connects to client device 110 but that is not necessarily a part of the core architecture of client device 110. A peripheral may be operable to provide extended functionality to client device 110, and may or may not be wholly dependent on client device 110. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
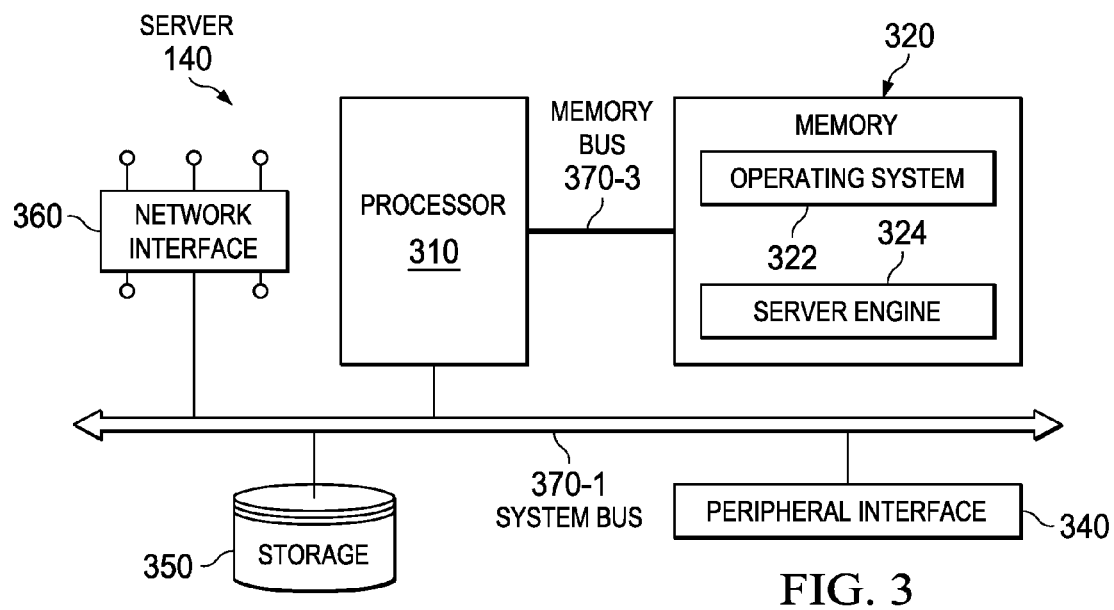
FIG. 3 is a block diagram of a server according to one or more examples of the present Specification.

FIG. 3 is a block diagram of server 140 according to one or more examples of the present Specification. Server 140 may be any suitable computing device, as described in connection with FIG. 2. In general, the definitions and examples of FIG. 2 may be considered as equally applicable to FIG. 3, unless specifically stated otherwise.

Server 140 includes a processor 310 connected to a memory 320, having stored therein executable instructions for providing an operating system 322 and server engine 324. Other components of server 140 include a storage 350, network interface 360, and peripheral interface 340.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3. To simplify this disclosure, memory 320 is disclosed as a single logical block, but in a physical embodiment may include one or more blocks of any suitable volatile or non-volatile memory technology or technologies, as described in connection with memory 220 of FIG. 2. In certain embodiments, memory 320 may comprise a relatively low-latency volatile main memory, while storage 350 may comprise a relatively higher-latency non-volatile memory. However, memory 320 and storage 350 need not be physically separate devices, as further described in connection with FIG. 2

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324. Many other configurations are also possible, and are intended to be encompassed within the broad scope of this Specification.

Network interface 360 may be provided to communicatively couple server 140 to a wired or wireless network.

Server engine 324, in one example, is a utility or program that carries out methods according to this Specification, including providing server-side anti-malware services and updates for computing devices 110. Server engine 324 may also perform "deep" analysis of suspect objects to provide a higher confidence of whether the object is malicious. Server engine 324 may be, in various embodiments, embodied in hardware, software, firmware, or some combination thereof. For example, in some cases, server engine 324 may include a special integrated circuit designed to carry out a method or a part thereof, and may also include software instructions operable to instruct a processor to perform the method. In some cases, server engine 324 may run as a daemon process, as described above. It should also be noted that server engine 324 is provided by way of non-limiting example only, and that other hardware and software, including interactive or user-mode software, may also be provided in conjunction with, in addition to, or instead of server engine 324 to perform methods according to this Specification.

In one example, server engine 324 includes executable instructions stored on a non-transitory medium operable to perform methods according to this Specification. At an appropriate time, such as upon booting server 140 or upon a command from operating system 322 or a user 120, processor 310 may retrieve a copy of server engine 324 (or software portions thereof) from storage 350 and load it into memory 320. Processor 310 may then iteratively execute the instructions of server engine 324.

Peripheral interface 340 may be configured to interface with any auxiliary device that connects to server 140 but that is not necessarily a part of the core architecture of server 140. A peripheral may be operable to provide extended functionality to server 140, and may or may not be wholly dependent on server 140. In some cases, a peripheral may be a computing device in its own right. Peripherals may include, by way of non-limiting examples, any of the devices discussed in connection with peripheral interface 240 of FIG. 2.

Figure 4:
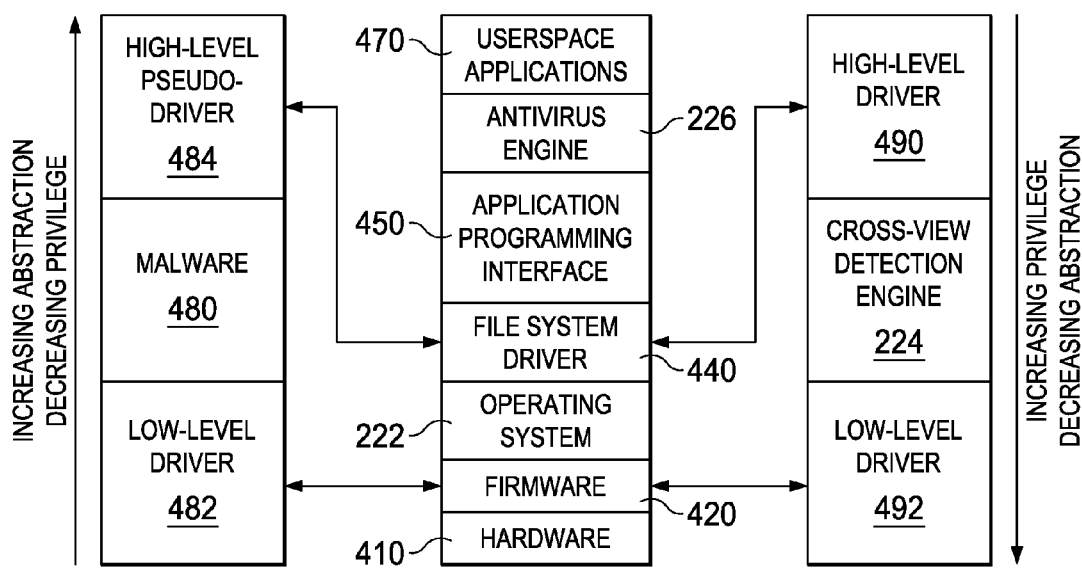
FIG. 4 is a functional block diagram of a cross-view detection engine according to one or more examples of the present Specification.

FIG. 4 is a functional block diagram and operational stack according to one or more examples of the present Specification. At the lowest level of abstraction, or conversely at the highest privilege level, is hardware 410. This indicates that hardware 410 is simply capable of doing whatever hardware 410 is capable of doing. At this level of abstraction, there are no artificial limitations. Rather, the limitations at this level are simply the limitations of inherent capabilities. Also at hardware level 410, no abstraction is provided. Hardware 410 is fundamentally controlled in most cases by electrical or electromechanical signals. Such signals drive direct physical responses in hardware 410, providing desired operations.

Firmware 420 sits just above hardware 410 on an abstraction level, and just below hardware 410 on a privilege level. Firmware 420 may, for example, provide a small number of direct commands, which can be translated into electrical signals for use with hardware 410.

Monitoring of "low-level" disk operations may, in one example, occur at either hardware level 410 or at firmware level 420. One method may be to monitor an ATAPI, SCSI, or SATA bus for information such as sector number, operation type (read or write), and the data being read or written.

Malware 480 and cross-view detection engine 224 both include a low-level driver to directly manipulate and/or monitor firmware 420. Cross-view detection engine 224 provides low-level driver 492. Malware 480 provides low-level driver 482. In one example, malware 480 uses low-level driver 482 to directly manipulate disk operations on hardware 410 via a firmware 420. These operations may not be visible at operating system level 222. However, cross-view detection engine 224 uses low-level driver 492 to observe these interactions.

At the next level of abstraction is operating system 222. Operating system 222 may provide a variety of drivers, interfaces, and services that enable higher-level programs to perform hardware operations. One useful function of operating system 222 is to provide abstraction via drivers so that a single object such as an executable process can issue identical commands to perform useful work on a variety of hardware platforms. For example, hardware 410 may be a hard disk drive provided by a manufacturer. Because operating system 222 abstracts disk operations provided to hardware 410, an end-user need not know or care about which specific hard drive from which specific manufacturer will be used at hardware level 410.

At the next level of abstraction is file system driver 440. File system driver 440 provides a low-level interface via operating system 222 organizing, storing, and retrieving files. Popular file system drivers include Windows NTFS, ext3 or ext4 on Linux, Apple hierarchical file system (HFS), and various UNIX file systems such as UFS, BSDFS, and ZFS.

Malware 480 may provide a high level pseudo-driver 484 that interfaces with file system driver 440. The purpose of malware pseudo-driver 484 is to issue dummy commands to file system driver 440 to create the appearance of performing legitimate file operations. However low-level driver 482 blocks these commands, so that they are not actually executed on the disk hardware 410. Rather, while those dummy commands are being issued, low-level driver 482 is performing the task actually required by malware 480. Note that interception of calls at the file system driver level is provided as an example only. In other cases, these operations may occur at other levels of abstraction, including at a hypervisor or virtual machine level.

Cross-view detection engine 224 also includes a high-level driver 490. It should be noted that the designation of driver 490 as "high-level" is in relation to low-level driver 492, not necessarily in relation to other levels of abstraction, such as user space applications 470, which operate at an even higher level of abstraction and with lower levels of privilege. The purpose of high-level driver 490 is to observe the behavior of high-level pseudo-driver 484 so that operations ostensibly performed by high-level pseudo-driver 484 can be compared to operations actually carried out at firmware level 420.

At the next level of abstraction is application programming interface 450. Application programming interface 450 provides various standard methods so that user space applications 470 can perform file operations without the necessity of being concerned about specific implementation details of those operations. For example, application programming interface 450 may provide an fprintf( ) function which a user space application can use to write to disk without needing to be aware about the implementation details.

At the next level of abstraction is antivirus engine 226. Antivirus engine 226 may provide standard anti-malware or antivirus operations, such as detection, mitigation, and remediation of malware objects. Antivirus engine 226 is provided in addition to cross-view detection engine 224, so that they can cooperatively work to increase the security of computing device 110. It should be noted, however, that in certain embodiments, antivirus engine 226 is optional.

At the highest level of abstraction in this example, and conversely at the lowest level of privilege, are user space applications 470. User space applications 470 may have permission only to write to certain files or folders provided by file system driver 440, or only according to certain permissions granted to user space applications 470.

FIG. 5 is a flow chart of a method 500 of performing cross-view detection according to one or more examples of the present Specification. In certain examples, method 500 may be performed by cross-view detection engine 224 of FIG. 2.

In one example, method 500 starts with two parallel paths. High-level driver 490 may use the path of block 510, while low-level driver 492 may use the path of block 520.

In block 510, high-level driver 490 performs dynamic, real-time analysis of system-level call traces. This may include intercepting disk operations at a useful level, such as at file system driver level 440, and analyzing those.

In block 530, cross-view detection engine 224 extracts call traces from high-level operations detected in block 510. This results in block 552 in extracted call traces.

In the parallel path of block 520, low-level driver 492 intercepts disk access information from standard disk protocols, such as those provided by firmware 420.

In block 540, cross-view detection engine 224 reconstructs system-level call traces from the low-level access operations. This results in block 550 in reconstructed call traces.

In block 560, cross-view detection engine 224 compares reconstructed call traces 550 to deconstructed call traces 552.

In decision block 562, cross-view detection engine 224 determines whether the reconstruction call traces match the deconstructed call traces 552.

In block 580, if reconstructing call traces 550 match deconstructed call traces 552, then operations may be passed to standard antivirus engine 226. Antivirus engine 226 may then perform standard antivirus operations, such as looking for other examples of malware behavior.

As used throughout this Specification, a "reconstructed" call trace is a call trace that has been translated from a lower level of abstraction into a higher level of abstraction. A "deconstructed" call trace is a call trace that has been translated from a higher level of abstraction into a lower level of abstraction. In one example, a reconstructed call trace and deconstructed call trace are constructed to a similar level of abstraction so that they can be usefully compared.

Returning to decision block 562, if reconstructed call traces 550 do not match deconstructed call traces 552, then the object performing the disk access may be marked either as malware, or at least as suspicious. Objects marked as malware may be blacklisted, while objects listed as suspicious may be subject to additional analysis, including in some examples, reporting the object to server 140, so that server 140 may use server engine 324 to perform greater or more in depth analysis of the object, and to report back to computing device 110 whether the object ought to be blocked.

In block 590, the method is done.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offers an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

Example Implementations

There is disclosed in an example 1, a computing apparatus comprising: a memory; and a crossview detection engine operable for: observing a first operation performed by an executable object on the memory at a first abstraction level; observing a substantially simultaneous second operation performed by the executable object on the memory at a second abstraction level; making a determination that the first operation does not substantially match the second operation; and acting on the determination.

There is disclosed in an example 2, the computing apparatus of example 1, wherein the first abstraction level is a file system driver level.

There is disclosed in an example 3, the computing apparatus of example 1, wherein the second abstraction level is a firmware level.

There is disclosed in an example 4, the computing apparatus of example 1, wherein the second abstraction level is a lower abstraction level than the first abstraction level.

There is disclosed in an example 5, the computing apparatus of example 1, wherein the second operation is a write operation.

There is disclosed in an example 6, the computing apparatus of example 1, wherein acting on the determination comprises designating the executable object as malware.

There is disclosed in an example 7, the computing apparatus of example 1, wherein acting on the determination comprises designating the executable object as suspicious and reporting the executable object to a server.

There is disclosed in an example 8, the computing apparatus of example 1, wherein making a determination that the first operation does not substantially match the second operation comprises reconstructing one or more call traces from the second operation.

There is disclosed in an example 9, the computing apparatus of example 1, wherein making a determination that the first operation does not substantially match the second operation comprises deconstructing one or more call traces from the first operation.

There is disclosed in an example 10, the computing apparatus of example 1, wherein making a determination that the first operation does not substantially match the second operation comprises: reconstructing one or more call traces from the second operation; deconstructing one or more call traces from the first operation; and comparing the reconstructed call traces to the deconstructed call traces.

There is disclosed in an example 11, the computing apparatus of example 1, wherein observing the first operation performed by the executable object on the memory at the first abstraction level comprises performing dynamic analysis of system-level call tracing.

There is disclosed in an example 12, the computing apparatus of example 11, wherein observing the first operation performed by the executable object on the memory at the first abstraction level further comprises real-time analysis of call traces.

There is disclosed in an example 13, the computing apparatus of example 1, wherein observing the substantially simultaneous second operation performed by the executable object on the memory at a second abstraction level comprises intercepting disk access information from disk protocols.

There is disclosed in an example 14, one or more computer-readable mediums having stored thereon executable instructions for providing a cross-view detection engine operable for: observing a first operation performed by an executable object on a memory at a first abstraction level; observing a substantially simultaneous second operation performed by the executable object on the memory at a second abstraction level; making a determination that the first operation does not substantially match the second operation; and acting on the determination.

There is disclosed in an example 15, the one or more computer-readable mediums of example 14, wherein the first abstraction level is a file system driver level.

There is disclosed in an example 16, the one or more computer-readable mediums of example 14, wherein the second abstraction level is a firmware level.

There is disclosed in an example 17, the one or more computer-readable mediums of example 14, wherein the second abstraction level is a lower abstraction level than the first abstraction level.

There is disclosed in an example 18, the one or more computer-readable mediums of example 14, wherein the second operation is a write operation.

There is disclosed in an example 19, the one or more computer-readable mediums of example 14, wherein acting on the determination comprises designating the executable object as malware.

There is disclosed in an example 20, the one or more computer-readable mediums of example 14, wherein acting on the determination comprises designating the executable object as suspicious and reporting the executable object to a server.

There is disclosed in an example 21, the one or more computer-readable mediums of example 14, wherein making a determination that the first operation does not substantially match the second operation comprises: reconstructing one or more call traces from the second operation; deconstructing one or more call traces from the first operation; and comparing the reconstructed call traces to the deconstructed call traces.

There is disclosed in an example 22, the one or more computer-readable mediums of example 14, wherein observing the first operation performed by the executable object on the memory at the first abstraction level comprises performing real-time dynamic analysis of system-level call tracing.

There is disclosed in an example 23, the one or more computer-readable mediums of example 14, wherein observing the substantially simultaneous second operation performed by the executable object on the memory at a second abstraction level comprises intercepting disk access information from disk protocols.

There is disclosed in an example 24, a computer-implemented method of providing a cross-view detection engine, comprising: observing a first operation performed by an executable object on the memory at a first abstraction level; observing a substantially simultaneous second operation performed by the executable object on the memory at a second abstraction level; making a determination that the first operation does not substantially match the second operation; and acting on the determination.

There is disclosed in an example 25, the method of example 24, wherein making a determination that the first operation does not substantially match the second operation comprises: reconstructing one or more call traces from the second operation; deconstructing one or more call traces from the first operation; and comparing the reconstructed call traces to the deconstructed call traces.

There is disclosed in an example 26, a method comprising the performing the instructions disclosed in any of examples 14-23.

There is disclosed in example 27, an apparatus comprising means for performing the method of example 26.

There is disclosed in example 28, the apparatus of example 27, wherein the apparatus comprises a processor and memory.

There is disclosed in example 29, the apparatus of example 28, wherein the apparatus further comprises a computer-readable medium having stored thereon software instructions for performing the method of example 26.

What is claimed is:

1. A computing apparatus comprising:
   a processor;
   a memory; and
   one or more hardware and/or software logic elements comprising a crossview detection engine operable for:
      observing a first operation performed by an executable object on the memory at a first computational abstraction level;
      observing a substantially simultaneous second operation performed by the executable object on the memory at a second computational abstraction level, wherein the second abstraction level is different from the first abstraction level;
      determining that the first operation does not substantially have the same computational effect as the second operation, comprising converting the first operation and the second operation into a comparable format; and
      designating the executable object as suspect.

2. The computing apparatus of claim 1, wherein the first abstraction level is a file system driver level.

3. The computing apparatus of claim 1, wherein the second abstraction level is a firmware level.

4. The computing apparatus of claim 1, wherein the second abstraction level is a lower abstraction level than the first abstraction level.

5. The computing apparatus of claim 1, wherein the second operation is a write operation.

6. The computing apparatus of claim 1, wherein acting on the determination comprises designating the executable object as malware.

7. The computing apparatus of claim 1, wherein acting on the determination comprises designating the executable object as suspicious and reporting the executable object to a server.

8. The computing apparatus of claim 1, wherein making a determination that the first operation does not substantially match the second operation comprises reconstructing one or more call traces from the second operation.

9. The computing apparatus of claim 1, wherein making a determination that the first operation does not substantially match the second operation comprises deconstructing one or more call traces from the first operation.

10. The computing apparatus of claim 1, wherein making a determination that the first operation does not substantially match the second operation comprises:

reconstructing one or more call traces from the second operation;

deconstructing one or more call traces from the first operation; and comparing the reconstructed call traces to the deconstructed call traces.

11. The computing apparatus of claim 1, wherein observing the first operation performed by the executable object on the memory at the first abstraction level comprises performing dynamic analysis of system-level call tracing.

12. The computing apparatus of claim 11, wherein observing the first operation performed by the executable object on the memory at the first abstraction level further comprises real-time analysis of call traces.

13. The computing apparatus of claim 1, wherein observing the substantially simultaneous second operation performed by the executable object on the memory at a second abstraction level comprises intercepting disk access information from disk protocols.

14. One or more non-transitory computer-readable mediums having stored thereon executable instructions for providing a cross-view detection engine operable for:

observing a first operation performed by an executable object on a memory at a first computational abstraction level;

observing a substantially simultaneous second operation performed by the executable object on the memory at a second computational abstraction level, wherein the second abstraction level is different from the first abstraction level;

determining that the first operation does not substantially have the same computational effect as the second operation, comprising converting the first operation and the second operation into a comparable format; and designating the executable object as suspicious.

15. The one or more computer-readable mediums of claim 14, wherein the first abstraction level is a file system driver level.

16. The one or more computer-readable mediums of claim 14, wherein the second abstraction level is a firmware level.

17. The one or more computer-readable mediums of claim 14, wherein the second abstraction level is a lower abstraction level than the first abstraction level.

18. The one or more computer-readable mediums of claim 14, wherein the second operation is a write operation.

19. The one or more computer-readable mediums of claim 14, wherein acting on the determination comprises designating the executable object as malware.

20. The one or more computer-readable mediums of claim 14, wherein acting on the determination comprises designating the executable object as suspicious and reporting the executable object to a server.

21. The one or more computer-readable mediums of claim 14, wherein making a determination that the first operation does not substantially match the second operation comprises:

reconstructing one or more call traces from the second operation;

deconstructing one or more call traces from the first operation; and comparing the reconstructed call traces to the deconstructed call traces.

22. The one or more computer-readable mediums of claim 14, wherein observing the first operation performed by the executable object on the memory at the first abstraction level comprises performing real-time dynamic analysis of system-level call tracing.

23. The one or more computer-readable mediums of claim 14, wherein observing the substantially simultaneous second operation performed by the executable object on the memory at a second abstraction level comprises intercepting disk access information from disk protocols.

24. A computer-implemented method of providing a cross-view detection engine, comprising:

observing a first operation performed by an executable object on the memory at a first computational abstraction level;

observing a substantially simultaneous second operation performed by the executable object on the memory at a second computational abstraction level, wherein the second abstraction level is different from the first abstraction level;

determining that the first operation does not substantially have the same computational effect as the second operation, comprising converting the first operation and the second operation into a comparable format; and designating the executable object as suspicious.

25. The method of claim 24, wherein making a determination that the first operation does not substantially match the second operation comprises:

reconstructing one or more call traces from the second operation;

deconstructing one or more call traces from the first operation; and comparing the reconstructed call traces to the deconstructed call traces.

* * * * *

UNITED STATES PATENT AND TRADEMARK OFFICE
CERTIFICATE OF CORRECTION

PATENT NO. : 9,609,005 B2  
APPLICATION NO. : 14/496860  
DATED : March 28, 2017  
INVENTOR(S) : Simon Hunt et al.

Page 1 of 1

It is certified that error appears in the above-identified patent and that said Letters Patent is hereby corrected as shown below:

In the Claims

In Column 18, Line 26, in Claim 1, delete "crossview" and insert -- cross-view --, therefor.

In Column 20, Line 38, in Claim 24, delete "and" and insert -- and, --, therefor.

Signed and Sealed this
Sixteenth Day of May, 2017

Michelle K. Lee
*Director of the United States Patent and Trademark Office*